US011185793B2

(12) United States Patent
Sano et al.

(10) Patent No.: US 11,185,793 B2
(45) Date of Patent: Nov. 30, 2021

(54) SOLID-LIQUID SEPARATING SYSTEM AND SOLID-LIQUID SEPARATING METHOD

(71) Applicant: HITACHI, LTD., Tokyo (JP)

(72) Inventors: Tadashi Sano, Tokyo (JP); Mitsuhiro Matsuzawa, Tokyo (JP); Sachio Sekiya, Tokyo (JP)

(73) Assignee: HITACHI, LTD., Tokyo (JP)

( * ) Notice: Subject to any disclaimer, the term of this patent is extended or adjusted under 35 U.S.C. 154(b) by 104 days.

(21) Appl. No.: 16/607,276

(22) PCT Filed: Apr. 13, 2018

(86) PCT No.: PCT/JP2018/015516
§ 371 (c)(1),
(2) Date: Oct. 22, 2019

(87) PCT Pub. No.: WO2018/198825
PCT Pub. Date: Nov. 1, 2018

(65) Prior Publication Data
US 2020/0298142 A1 Sep. 24, 2020

(30) Foreign Application Priority Data
Apr. 26, 2017 (JP) .............................. JP2017-087032

(51) Int. Cl.
*B01D 11/04* (2006.01)
*F25B 1/00* (2006.01)
(Continued)

(52) U.S. Cl.
CPC ........ *B01D 11/0488* (2013.01); *B01D 1/0047* (2013.01); *B01D 11/0492* (2013.01); *F25B 1/00* (2013.01); *C11B 1/10* (2013.01)

(58) Field of Classification Search
CPC .............. B01D 11/0488; B01D 1/0047; B01D 11/0492; B01D 11/028; B01D 11/0288;
(Continued)

(56) References Cited

U.S. PATENT DOCUMENTS 2,152,666 A * 4/1939 Rosenthal ............. C11B 7/0008
554/16
4,375,387 A * 3/1983 deFilippi ................ B01D 3/143
196/134
(Continued)

FOREIGN PATENT DOCUMENTS

JP        S56-067503 A       6/1981
JP        S62-227403 A      10/1987
(Continued)

OTHER PUBLICATIONS

International Search Report dated Jul. 3, 2018 for the International PCT Application No. PCT/JP2018/015516.

*Primary Examiner* — Joseph W Drodge
(74) *Attorney, Agent, or Firm* — Volpe Koenig

(57) ABSTRACT

A solid-liquid separating method and system for separating a processing object into solid and liquid, is simplified by using fewer devices. A solid-liquid separating system includes a processing tank that houses a processing object, a first and a second heat exchanger, a material A supplying means, a collecting tank, a closed system including the first and second heat exchangers, a compressor, and an expansion valve, and a material B that circulates while a state is changed in this system. A material A that is gaseous at normal temperature and normal pressure, can dissolve oil when liquefied, and does not dissolve water is gasified in the first heat exchanger while being separated from the oil, is liquefied in the second heat exchanger, and the liquefied material A is supplied to the processing tank by the material
(Continued)

A supplying means. The oil is collected in the tank from the first heat exchanger.

19 Claims, 8 Drawing Sheets

(51) Int. Cl.
*C11B 1/10* (2006.01)
*B01D 1/00* (2006.01)

(58) Field of Classification Search
CPC .......... B01D 5/006; B01D 3/007; B01D 1/02; B01D 11/02; B01D 11/0292; B01D 11/0296; B01D 2011/007; F25B 1/00; C11B 1/10; C11B 1/104; C11B 1/108; C11B 7/0008; C11B 7/0016; C11B 7/0025; C11B 7/0033; C11B 7/0058; C11B 9/025
USPC ..... 210/511, 634, 639; 554/8, 12–14, 20, 21
See application file for complete search history.

(56) References Cited

U.S. PATENT DOCUMENTS

| | | | | |
|---|---|---|---|---|
| 5,294,303 A | * | 3/1994 | Robbins | B01D 3/38 203/10 |
| 5,516,923 A | * | 5/1996 | Hebert | B01D 35/153 554/12 |
| 5,707,673 A | * | 1/1998 | Prevost | C11B 1/104 210/634 |
| 10,589,189 B2 | * | 3/2020 | Sano | B01D 11/0288 |
| 2002/0182722 A1 | * | 12/2002 | Corr | B01D 3/40 435/309.1 |
| 2009/0166175 A1 | * | 7/2009 | Waibel | B01D 3/40 203/49 |
| 2016/0091226 A1 | * | 3/2016 | Buese | B01D 11/0284 62/115 |
| 2016/0158763 A1 | | 6/2016 | Sano et al. | |
| 2018/0028935 A1 | | 2/2018 | Sano et al. | |
| 2021/0016203 A1 | * | 1/2021 | Sano | B01D 11/0207 |
| 2021/0077919 A1 | * | 3/2021 | Sano | B01D 11/0296 |

FOREIGN PATENT DOCUMENTS

| | | |
|---|---|---|
| JP | 2007-237129 A | 9/2007 |
| WO | 2015/015631 A1 | 2/2015 |
| WO | 2016121012 A1 | 8/2016 |

* cited by examiner

SOLID-LIQUID SEPARATING SYSTEM AND SOLID-LIQUID SEPARATING METHOD

TECHNICAL FIELD

The present invention relates to a solid-liquid separating system and a solid-liquid separating method.

BACKGROUND ART

One background technique of the present technical field is described in PTL 1. PTL 1 discloses a structure for separating a mixture into solid and liquid using a phase change cycle of a material A that is gaseous at normal temperature and normal pressure and that can dissolve water and oil in a liquid state. For the phase change cycle of the material A, a refrigerating cycle of a material B (chlorofluorocarbon, ammonia, isobutane, or the like) is used.

CITATION LIST

Patent Literature

PTL 1: Japanese Patent No. 6051308

SUMMARY OF INVENTION

Technical Problem

According to a method disclosed in PTL 1, DME (dimethyl ether) that can dissolve both water and oil is selected as one example of the material A and the mixture of water and oil is separated into liquid and solid. Since DME can dissolve both water and oil, the liquid part contains both water and oil. Therefore, in a case of extracting only oil from the mixture of water and oil by the method according to PTL 1, it has been necessary to provide an oil-water separator in order to extract only oil from the mixture of water and oil dissolved in DME. Moreover, in the case of using the phase change of the material A, it has been necessary to provide a pump in order to deliver the material A that has been liquefied.

The present invention has been made in view of the above circumstance, and an object of the present invention is to provide a solid-liquid separating system and a solid-liquid separating method for separating a processing object into solid and liquid, in which fewer devices are used and the structure and steps are simplified further.

Solution to Problem

In order to solve the problem, the present invention provides a solid-liquid separating system in which, from a processing object containing water, oil, and solid, the oil is separated and collected from the processing object by use of a material A that is gaseous at normal temperature and normal pressure and when liquefied, can dissolve the oil and does not dissolve water, the solid-liquid separating system including: a processing tank that houses the processing object; a first heat exchanger that gasifies the material A contained in a mixture of the material A and the oil obtained in the processing tank; a second heat exchanger that liquefies the material A that has been gasified in the first heat exchanger; a material A supplying means that supplies the material A that has been liquefied from the second heat exchanger to the first heat exchanger through the processing tank; a collecting tank that is connected to the first heat exchanger; a closed system including the first heat exchanger, the second heat exchanger, a compressor, and an expansion valve; and a material B that circulates while a state thereof is changed in the closed system, wherein the first heat exchanger condenses the material B compressed with the compressor and exchanges heat of condensation of the material B for heat of evaporation of the material A, the expansion valve reduces pressure of the material B that has been condensed, the second heat exchanger exchanges heat of evaporation of the material B for heat of condensation of the material A, the material A that has been gasified while being separated from the oil in the first heat exchanger is liquefied in the second heat exchanger, and the material A that has been liquefied is supplied to the processing tank by the material A supplying means, and by stopping the supply of the material A by the material A supplying means and continuing the circulation of the material B, the oil is collected from the first heat exchanger to the collecting tank.

The present invention also provides an oil extraction method in which, from a processing object containing water, oil, and solid, the oil is separated and collected from the processing object by use of a material A that is gaseous at normal temperature and normal pressure and when liquefied, can dissolve the oil and does not dissolve water, the solid-liquid separating method including: a step of supplying the material A to the processing object in a liquid state so as to obtain a mixture in which the oil is dissolved in the material A; a step of gasifying the material A in the mixture by heating the mixture so as to separate the oil from the material A and collect the oil; and a step of cooling the material A that has been gasified so as to liquefy the material A, and supplying the material A that has been liquefied to the processing object again, wherein the material A is gasified and liquefied while exchanging heat with a material B that repeats compression, condensation, expansion, and evaporation in a closed system.

Furthermore, the present invention provides a solid-liquid separating system in which, from a processing object containing liquid and solid, the liquid is separated and collected from the processing object by use of a material A that is gaseous at normal temperature and normal pressure and when liquefied, can dissolve the liquid, the solid-liquid separating system including: a processing tank that houses the processing object; a first heat exchanger that gasifies the material A contained in a mixture of the material A and the liquid obtained in the processing tank; a second heat exchanger that liquefies the material A that has been gasified in the first heat exchanger; a material A supplying means that supplies the material A that has been liquefied from the second heat exchanger to the first heat exchanger through the processing tank; a collecting tank that is connected to the first heat exchanger; a closed system including the first heat exchanger, the second heat exchanger, a compressor, and an expansion valve; and a material B that circulates while a state thereof is changed in the closed system, wherein the first heat exchanger condenses the material B compressed with the compressor and exchanges heat of condensation of the material B for heat of evaporation of the material A, the expansion valve reduces pressure of the material B that has been condensed, the second heat exchanger exchanges heat of evaporation of the material B for heat of condensation of the material A, the material A that has been gasified while being separated from the liquid in the first heat exchanger is liquefied in the second heat exchanger, and the material A that has been liquefied is supplied to the processing tank by the material A supplying means, by stopping the supply of the material A by the material A supplying means and continuing the circulation of the material B, the liquid is collected from the first heat exchanger to the collecting tank, the second heat exchanger, the processing tank, and the first heat exchanger are provided at positions that decrease in height in this order, and the material A supplying means supplies the material A that has been liquefied by gravity from the second heat exchanger to the first heat exchanger through the processing tank.

In addition, the present invention provides a solid-liquid separating method in which, from a processing object containing liquid and solid, the liquid is separated and collected from the processing object by use of a material A that is gaseous at normal temperature and normal pressure and when liquefied, can dissolve the liquid, the solid-liquid separating method including: a step of supplying the material A to the processing object in a liquid state in a processing tank so as to obtain a mixture in which the liquid is dissolved in the material A; a step of gasifying the material A in the mixture by heating the mixture by a first heat exchanger so as to separate the liquid from the material A and collect the liquid; and a step of cooling the material A that has been gasified so as to liquefy the material A by a second heat exchanger, and supplying the material A that has been liquefied to the processing object again by a material A supplying means, wherein the material A is gasified and liquefied while exchanging heat with a material B that repeats compression, condensation, expansion, and evaporation in a closed system, the second heat exchanger, the processing tank, and the first heat exchanger are provided at positions that decrease in height in this order, and the material A supplying means supplies the material A that has been liquefied by gravity from the second heat exchanger to the first heat exchanger through the processing tank.

More specific structures of the present invention will be made apparent in the scope of claims.

Advantageous Effects of Invention

According to the present invention, a solid-liquid separating system and a solid-liquid separating method for separating a processing object into solid and liquid, in which fewer devices are used and the structure and steps are simplified further can be provided.

The object, structure, and effect other than those above will be made apparent from the description of the embodiment below.

DESCRIPTION OF EMBODIMENTS

A solid-liquid separating system and a solid-liquid separating method according to the present invention are hereinafter described in detail with reference to the drawings.

Example 1

The present example describes a solid-liquid separating system and a solid-liquid separating method that can extract only oil efficiently from a processing object containing water, oil, and solid. Here, the processing object may be animals and vegetables (that can be raw materials for edible oil and aroma material) and the oil may be edible oil and a lipophilic aroma material. Specific examples of the extraction of the edible oil include the extraction of edible oil contained in vegetables such as soybeans and sesame, docosahexaenoic acid (DHA) or eicosapentaenoic acid (EPA) contained in fish, and fish oil.

The solid-liquid separating system and the solid-liquid separating method that are applied to the fish will be described below in the present example; however, as described above, the processing object in the present invention is not limited to fish.

Figure 1:
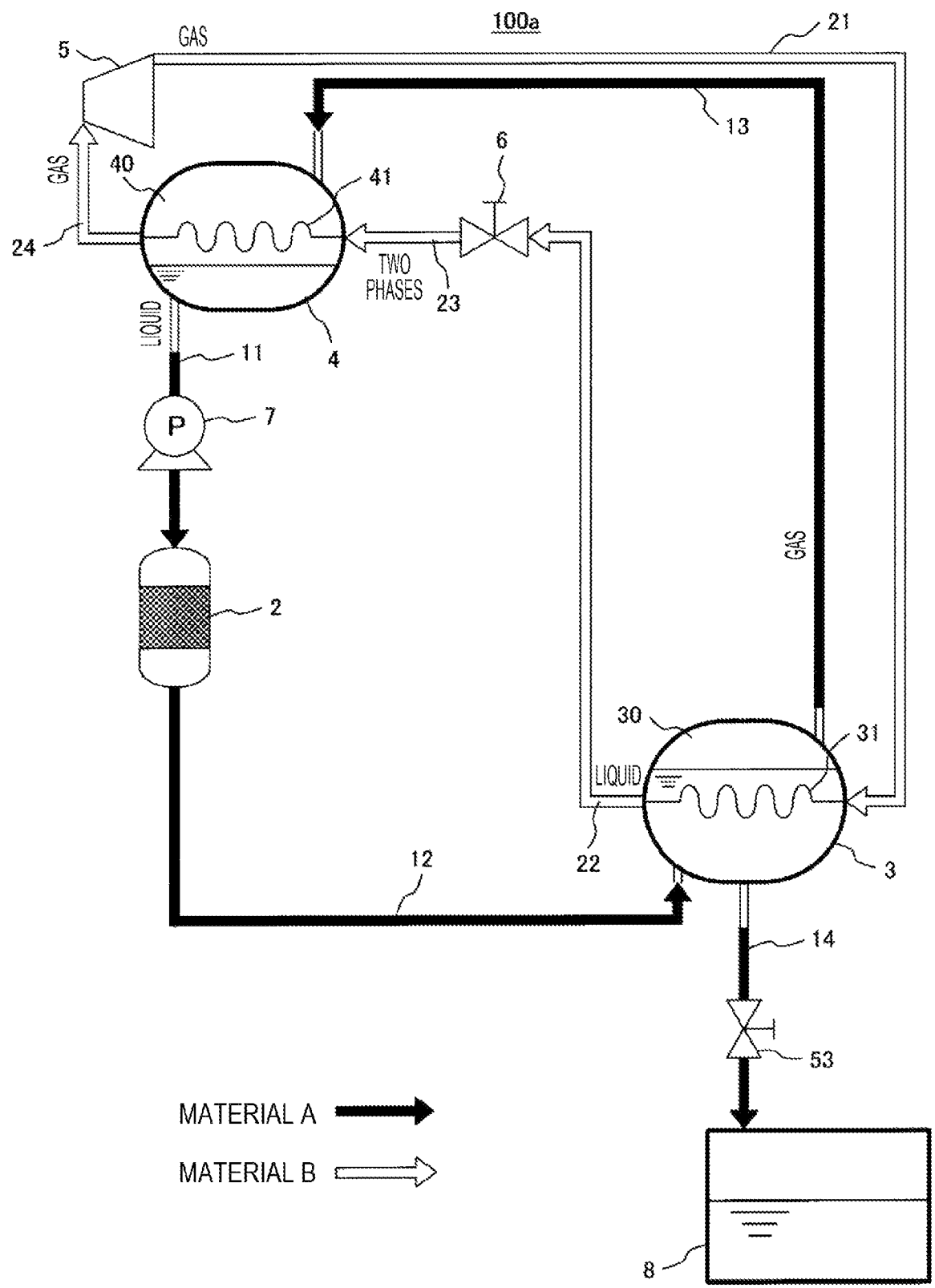
FIG. 1 is a schematic view illustrating a structure of a solid-liquid separating system according to Example 1.

FIG. 1 is a schematic view illustrating a structure of the solid-liquid separating system according to Example 1. In the present example, the material that is gaseous at normal temperature and normal pressure, dissolves oil when liquefied, and does not dissolve water is used as the material A. As the material A, butane (normal butane) is used. In this example, chlorofluorocarbon is used as a material B that circulates in a closed system while a state of the material B is changed repeatedly through compression, condensation, expansion, and evaporation. In this example, moreover, shell and tube type heat exchangers are used as two heat exchangers (heat exchangers 3, 4) and the both let the material A (butane) pass the shell.

First, the cycle of chlorofluorocarbon is described. In the present invention, heat and low-temperature heat necessary for the phase change of butane are supplied using the refrigerating cycle of chlorofluorocarbon. First, chlorofluorocarbon is discharged as high-temperature and high-pressure gas from a compressor 5 and through a pipe 21, sent to a tube 31 of the heat exchanger (first heat exchanger) 3. Here, the chlorofluorocarbon gas with high temperature and high pressure, while being condensed, transmits heat of condensation to the butane side; therefore, liquefied butane in a shell 30 becomes butane gas using the heat of condensation supplied from the chlorofluorocarbon gas as heat of evaporation.

Next, the liquefied chlorofluorocarbon that has become liquid with high temperature and high pressure is sent to an expansion valve 6 through a pipe 22, and since the pressure is reduced during the passage in the pipe, the temperature and pressure become lower. Then, the liquefied chlorofluorocarbon becomes a two-phase flow and is sent to a tube 41 of the heat exchanger (second heat exchanger) 4 through a pipe 23. Here, the butane gas in a shell 40, while being condensed, transmits the heat of condensation to the chlorofluorocarbon gas; therefore, the liquefied chlorofluorocarbon with low temperature becomes chlorofluorocarbon gas with low temperature and low pressure using the heat of condensation supplied from the butane gas as the heat of evaporation. Next, the chlorofluorocarbon gas is sent to the compressor 5 through a pipe 24 so as to be compressed again, and thus, a refrigerating cycle is formed.

Next, the cycle of butane is described. First, the liquefied butane discharged from the shell 40 of the heat exchanger 4 is sent to a processing tank 2 through a pipe 11 including a pump (material A supplying means) 7. The processing tank 2 is filled with the processing object and holds the processing object. In the processing tank 2, oil contained in the processing object is dissolved in the liquefied butane. Next, the liquefied butane that has dissolved the oil passes a filter (not shown) in the processing tank 2 and is sent to the heat exchanger 3 through a pipe 12. Here, the moisture contained in the processing object is hardly dissolved in butane and therefore remains in the processing tank 2 with the solid.

To the heat exchanger 3, the chlorofluorocarbon with the temperature a little higher than that of the liquefied butane is supplied continuously; therefore, the liquefied butane is heated with the sensible heat and the latent heat of the chlorofluorocarbon and is discharged as the butane gas. Here, since the oil dissolved in the liquefied butane has a temperature of less than or equal to the boiling point, the oil mostly remains in the heat exchanger 3 without evaporation.

The butane gas with high purity discharged from the heat exchanger 3 is sent to the heat exchanger 4 through a pipe 13. To the heat exchanger 4, the chlorofluorocarbon with the temperature lower than that of the butane gas is supplied continuously; therefore, the butane gas is cooled with the sensible heat and the evaporation latent heat of the chlorofluorocarbon and is discharged as the liquefied butane. The discharged liquefied butane is sent to the processing tank 2 again by the pump 7.

The above description is about the operation method in a steady state (solid-liquid separating operation). Continuing this steady operation increases the concentration of the oil in the shell of the heat exchanger 3. After the concentration of the oil has become a predetermined value or more, that is, the amount of extracted oil has reached a target value, the pump 7 is stopped or a valve (not shown) provided to the pipe 11 or the pipe 12 is closed and the operation of the cycle on the chlorofluorocarbon side is continued, so that the liquefied butane in the shell 30 of the heat exchanger 3 is mostly evaporated. Next, when a valve 53 provided to a pipe 14 is opened, the oil remaining in the shell 30 of the heat exchanger 3 is pushed out due to the internal pressure and the oil is collected in a tank 8. As described above, since water is hardly dissolved in butane, the water remains in the processing tank 2 and the oil that hardly contains water is collected in the tank 8.

As described above, in the invention according to PTL 1, it has been necessary to provide the oil-water separator between the first heat exchanger 3 and the collecting tank 8 in order to extract only oil from the mixture of water and oil dissolved in DME. In the present invention, butane that can dissolve oil and does not dissolve water is used; therefore, only the oil can be extracted and collected efficiently without requiring the oil-water separator. Thus, the solid-liquid separating method and the solid-liquid separating system including fewer devices with the device structure and steps simplified further can be provided.

In the present example, the material A that can dissolve oil and does not dissolve water is preferably the material whose water solubility when the material A is liquefied is 1 g/L or less at 20° C. The similar effect can be obtained when other hydrocarbon than butane is used as the material with a water solubility of 1 g/L or less at 20° C. Among such materials, gas of alkanes is preferable in consideration of toxicity. Specifically, propane, isobutane, or neopentane is preferable, and using a mixture of two or more kinds thereof can achieve the similar effect.

In addition, the material A preferably has a boiling point of −100° C. or more and 10° C. or less, or a saturated vapor pressure of 2 MPa or less at normal temperature. If the boiling point is less than −100° C., the vapor pressure at normal temperature becomes higher and the pressure resistance of the device needs to be increased; thus, the manufacturing cost for the device increases. If the boiling point is more than 10° C. and the outside temperature (temperature outside device) is less than 10° C., the distillation becomes difficult and the running cost increases. The boiling point of the material A is as follows: propane, −42.1° C.; isobutane, −11.7° C.; butane (normal butane), −0.5° C.; neopentane, 9.5° C. (source: Iwanami rikagakujiten, 5th edition (Iwanami shoten)). In consideration of the pressure resistance and the distillation temperature of the above device, butane is the most preferable as the material A.

In the solid-liquid separating system and the solid-liquid separating method according to the present example described above, the distillation energy of the liquefied gas such as butane used to extract oil is efficiently used by the refrigerating cycle of the chlorofluorocarbon, and moreover, since it is unnecessary to provide an oil-water separator, the running cost for the oil extraction can be drastically reduced.

The steps in the process for the processing object such as food, including the input into the processing tank 2, the extraction of oil, and discharging from the processing tank 2, are entirely performed at substantially normal temperature; thus, the heat deterioration can be suppressed.

Example 2

Figure 2:
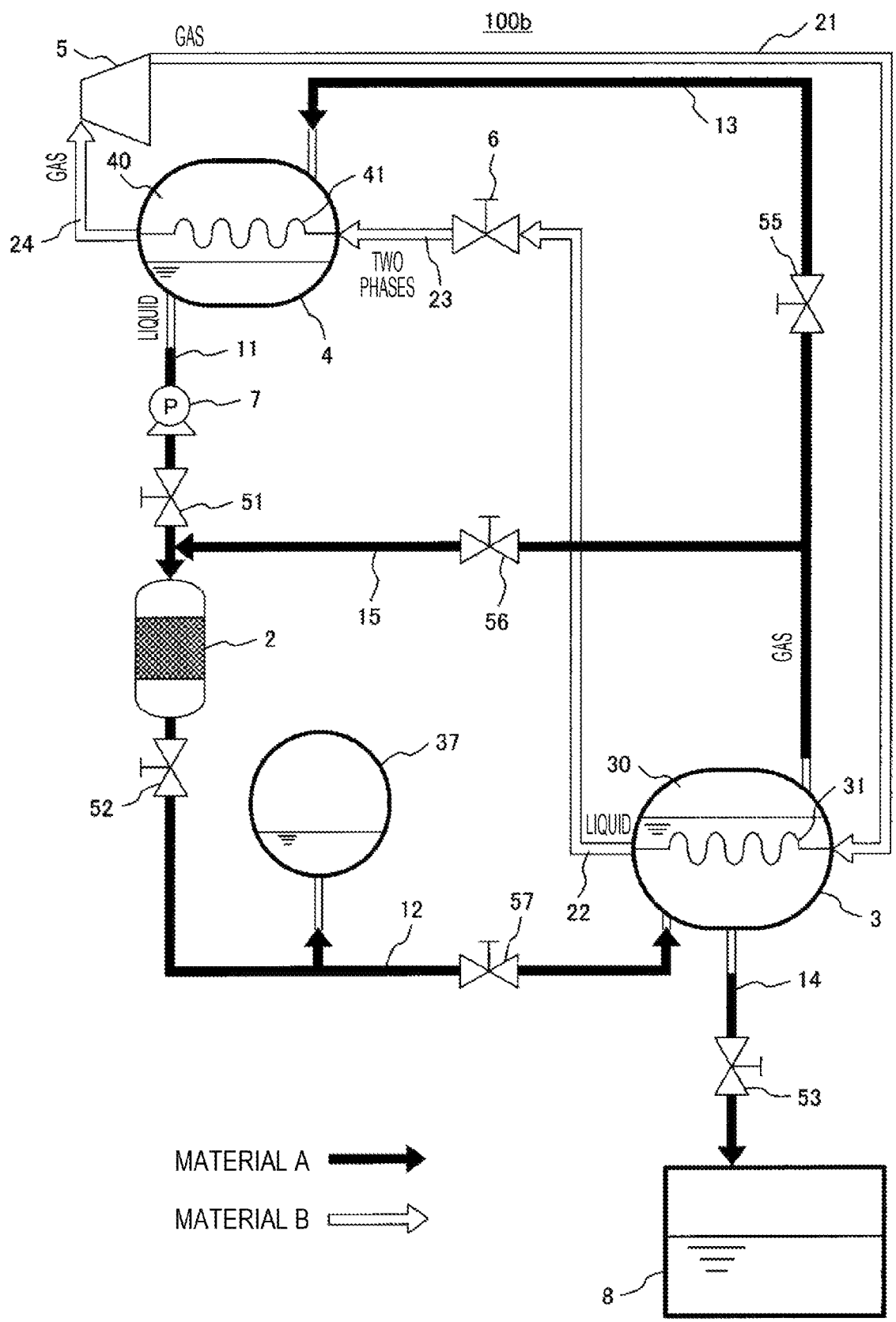
FIG. 2 is a schematic view illustrating a structure of a solid-liquid separating system according to Example 2.

FIG. 2 is a schematic view illustrating a structure of a solid-liquid separating system according to Example 2. A solid-liquid separating system 100b according to the present example includes a valve 51 in the pipe 11, a valve 55 in the pipe 13, and an accumulator 37 and valves 52 and 57 in the pipe 12. In addition, the solid-liquid separating system 100b includes a pipe 15 that connects between the first heat exchanger 3 and the processing tank 2 and supplies the material A liquefied in the first heat exchanger 3 to the processing tank 2, and a valve 56 in the pipe 15. In these points, the solid-liquid separating system 100b is different from the solid-liquid separating system in Example 1.

If the steady operation of the solid-liquid separating system 100b is continued, the oil (DHA) in the processing tank 2 decreases and the oil concentration in the shell 30 of the heat exchanger 3 increases. Therefore, it is necessary to collect the extracted oil and exchange the processing object (fish) in the processing tank 2. However, if the processing tank 2 is opened directly when the processing object is exchanged, the liquefied butane remaining in the processing tank 2 is reduced in pressure to atmospheric pressure and therefore, the liquefied butane is released in large quantity to the air. In view of this, in the present example, the liquefied butane is replaced by butane gas for the purpose of reducing the amount of liquefied butane in the processing tank 2.

First, in the case where the pump 7 is used, the operation is stopped and the valves 51, 53, and 57 are closed and the valve 56 is opened; in this state, the operation of the cycle on the chlorofluorocarbon side is continued so that the liquefied butane in the heat exchanger 3 is evaporated. The evaporated butane gas passes the valve 56 in the pipe 15 and is supplied to the processing tank 2 from above. The pressure in the upper part of the processing tank 2 gradually increases and the liquefied butane remaining in the processing tank 2 passes the valve 52 in the pipe 12 and is accumulated (collected) in the accumulator 37.

After the liquefied butane in the heat exchanger 3 is mostly evaporated, the valve 53 in the pipe 14 is opened, so that the oil remaining in the shell 30 of the heat exchanger 3 is pushed by the internal pressure and is collected in the tank 8. After that, first, the valve 56 and the valve 52 are closed and then, the processing tank 2 is opened; thus, the liquefied butane has the atmospheric pressure. Then, the fish in the processing tank 2 is exchanged and the next extracting process is started.

According to the present example, in addition to the effect in Example 1, the processing object in the processing tank 2 can be exchanged without releasing the liquefied butane in the processing tank 2 to the outside.

Example 3

Figure 3:
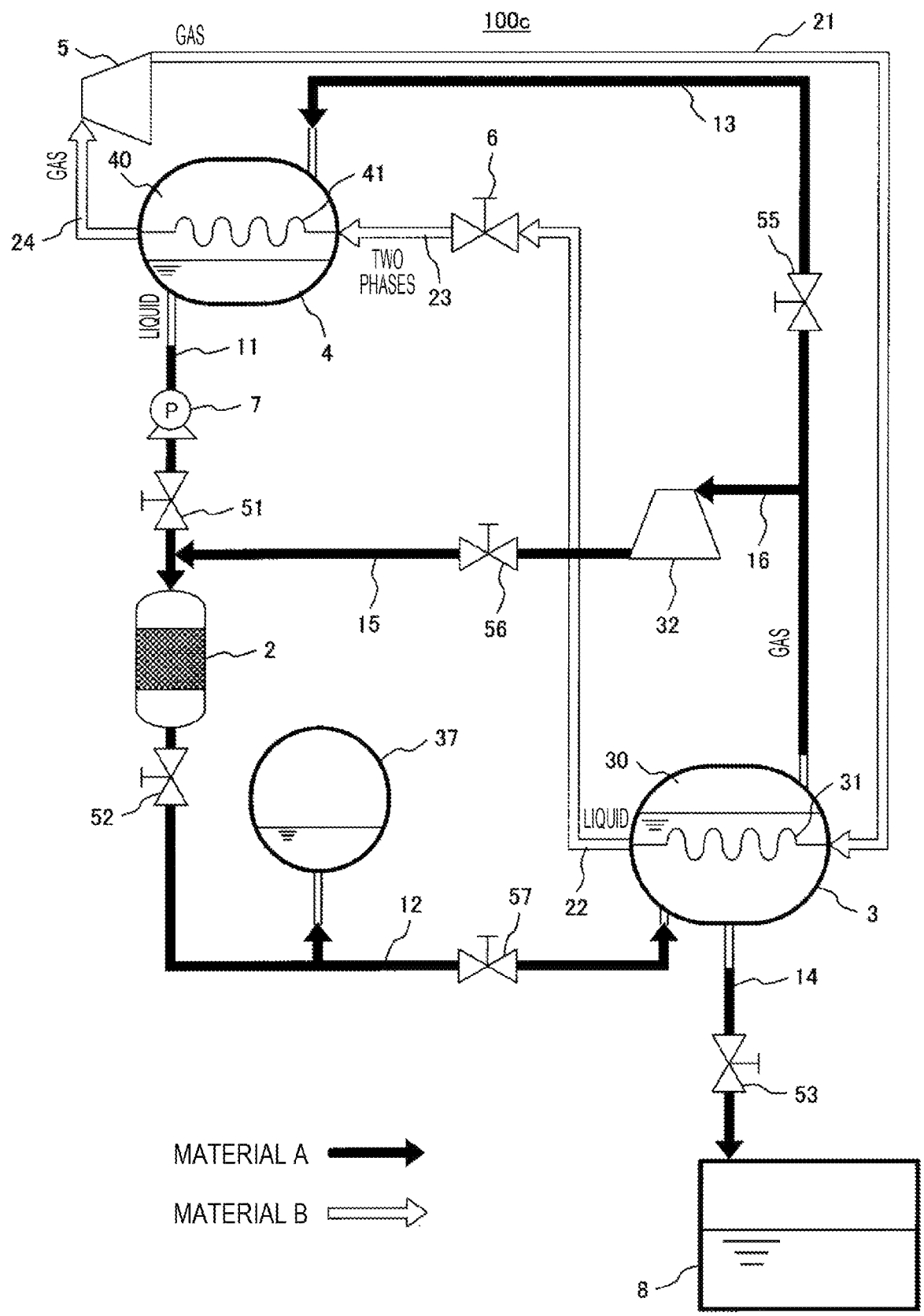
FIG. 3 is a schematic view illustrating a structure of a solid-liquid separating system according to Example 3.

FIG. 3 is a schematic view illustrating a structure of a solid-liquid separating system according to Example 3. A solid-liquid separating system 100c according to the present example is different from the solid-liquid separating system according to Example 2 in that a pipe 16 and a compressor 32 are provided. The compressor 32 is provided between the pipe 15 and the pipe 16 in the present example; thus, the pressure on the upstream side of the processing tank 2 can be increased to be higher than that in the structure according to Example 2, and therefore, the liquefied butane remaining in the processing tank 2 can be sent to the accumulator 37 efficiently.

In the present example, the liquefied butane remaining in the processing tank 2 can be discharged and the processing object in the processing tank 2 can be exchanged without releasing the liquefied butane to the outside more efficiently than in Example 2.

Example 4

Figure 4:
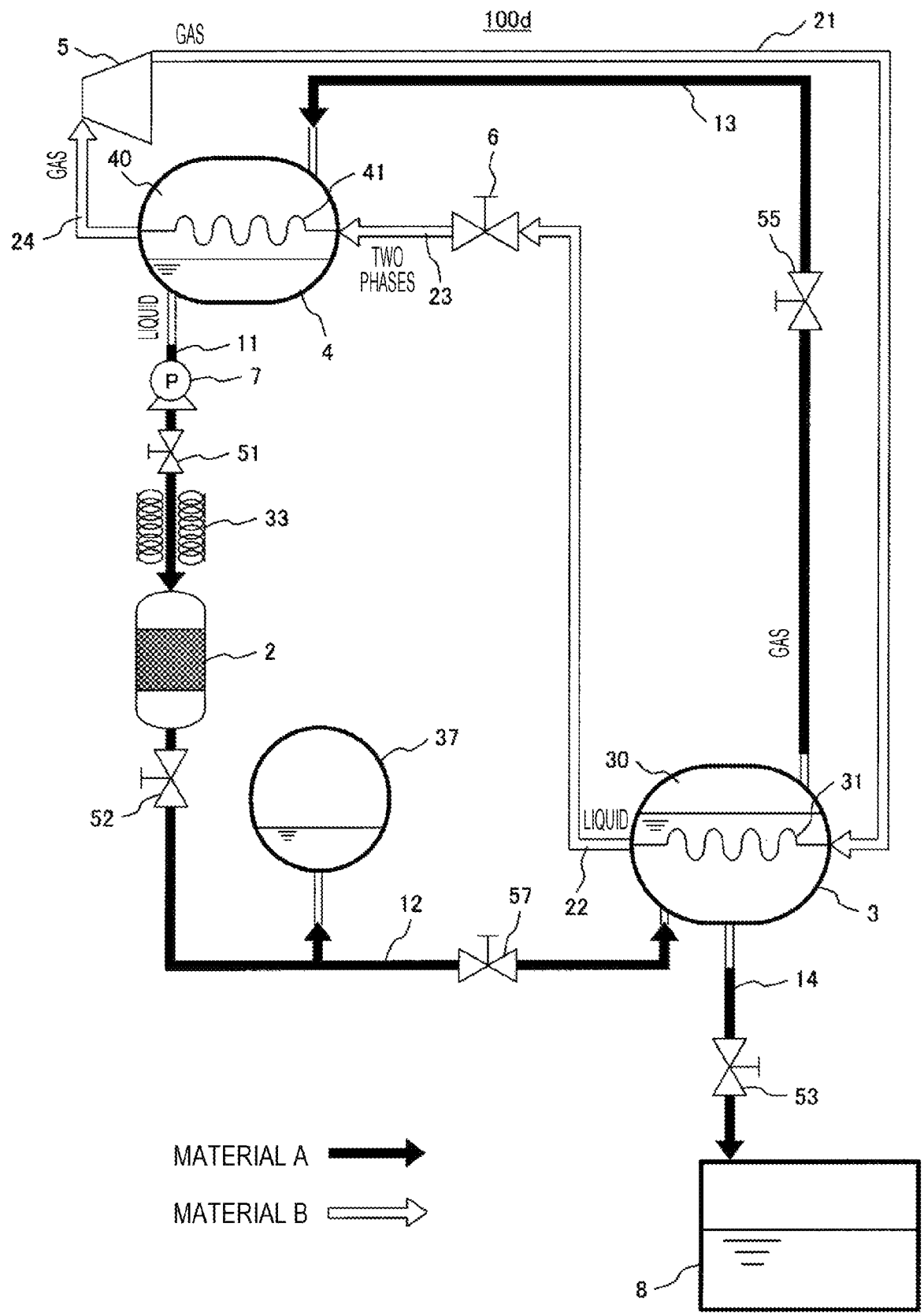
FIG. 4 is a schematic view illustrating a structure of a solid-liquid separating system according to Example 4.

FIG. 4 is a schematic view illustrating a structure of a solid-liquid separating system according to Example 4. A solid-liquid separating system 100d according to the present example is different from the solid-liquid separating system according to Example 2 in that the pipe 15 and the valve 56 are not provided and a heater 33 is provided to the pipe 11. Example 4 is different from Example 2 in the procedure of opening the processing tank 2.

An operation after the oil (DHA) is extracted from the processing object (fish) sealed in the processing tank 2 is described below. First, the valve 51 and the valve 57 are closed and the valve 52 is opened. Here, as the pipe 11 is heated by the heater 33 provided on the upstream side of the processing tank 2, the vapor pressure of the liquefied butane remaining in the pipe 11 increases and the pressure on the upstream side of the processing tank 2 increases. Thus, the liquefied butane remaining in the processing tank 2 can be discharged and sent to the accumulator 37. By opening the processing tank 2 with the valve 52 closed, the processing object can be exchanged without releasing the liquefied butane to the air.

According to the present example, similarly to Example 2, the processing object in the processing tank 2 can be exchanged without releasing the liquefied butane remaining in the processing tank 2 to the air.

Example 5

Figure 5:
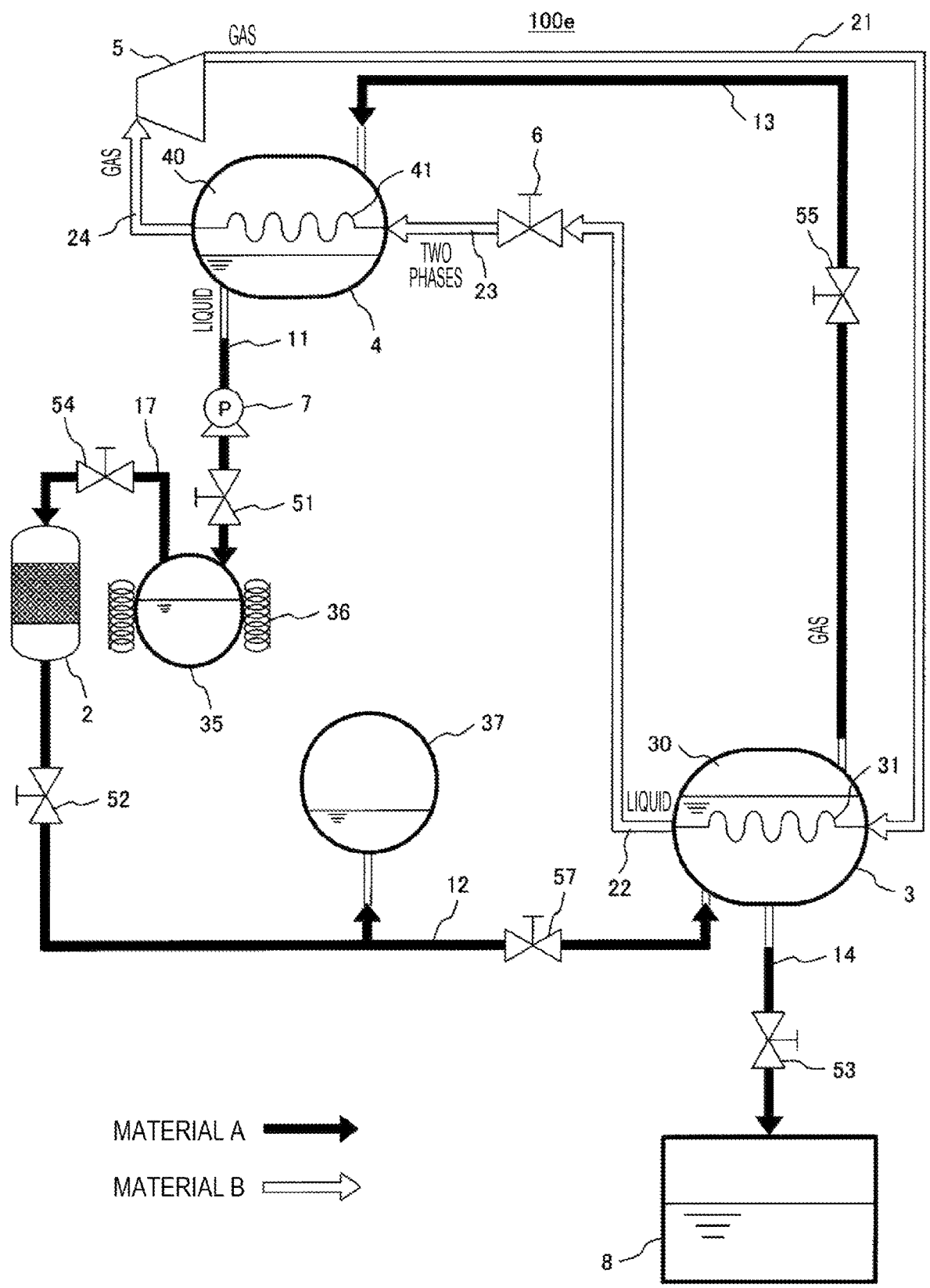
FIG. 5 is a schematic view illustrating a solid-liquid separating system according to Example 5.

FIG. 5 is a schematic view illustrating a structure of a solid-liquid separating system according to Example 5. A solid-liquid separating system 100e according to Example 5 is different from the solid-liquid separating system according to Example 2 in that the pipe 15 and the valve 56 are not provided and an accumulator (first accumulator) 35, a heater 36, a pipe 17, and a valve 54 are provided on the upstream side of the processing tank 2. With reference to FIG. 5, the solid-liquid separating system and the solid-liquid separating method according to another example of the present invention are described. Example 5 is different from Example 2 in the procedure of opening the processing tank 2.

An operation after the oil (DHA) is extracted from the processing object (fish) sealed in the processing tank 2 is described below. In the steady state, the accumulator 35, the pipe 17, and the processing tank 2 are mostly filled with liquefied butane. In order to open the processing tank 2, first, the valve 51 and the valve 57 are closed and the valve 52 and the valve 54 are opened. Here, as the accumulator 35 is heated by the heater 36, the vapor pressure in the accumulator 35 increases and the pressure on the upstream side of the processing tank 2 increases. Thus, the liquefied butane remaining in the processing tank 2 can be discharged and sent to the accumulator (second accumulator) 37. By opening the processing tank 2 with the valve 52 and the valve 54 closed, the amount of butane to be released to the air can be reduced.

According to the present example, similarly to Example 2, the processing object in the processing tank 2 can be exchanged without releasing the liquefied butane remaining in the processing tank 2 to the air. In addition, since the accumulator 35 is provided, more butane gas can be generated than in Examples 2 to 4.

Example 6

Figure 6:
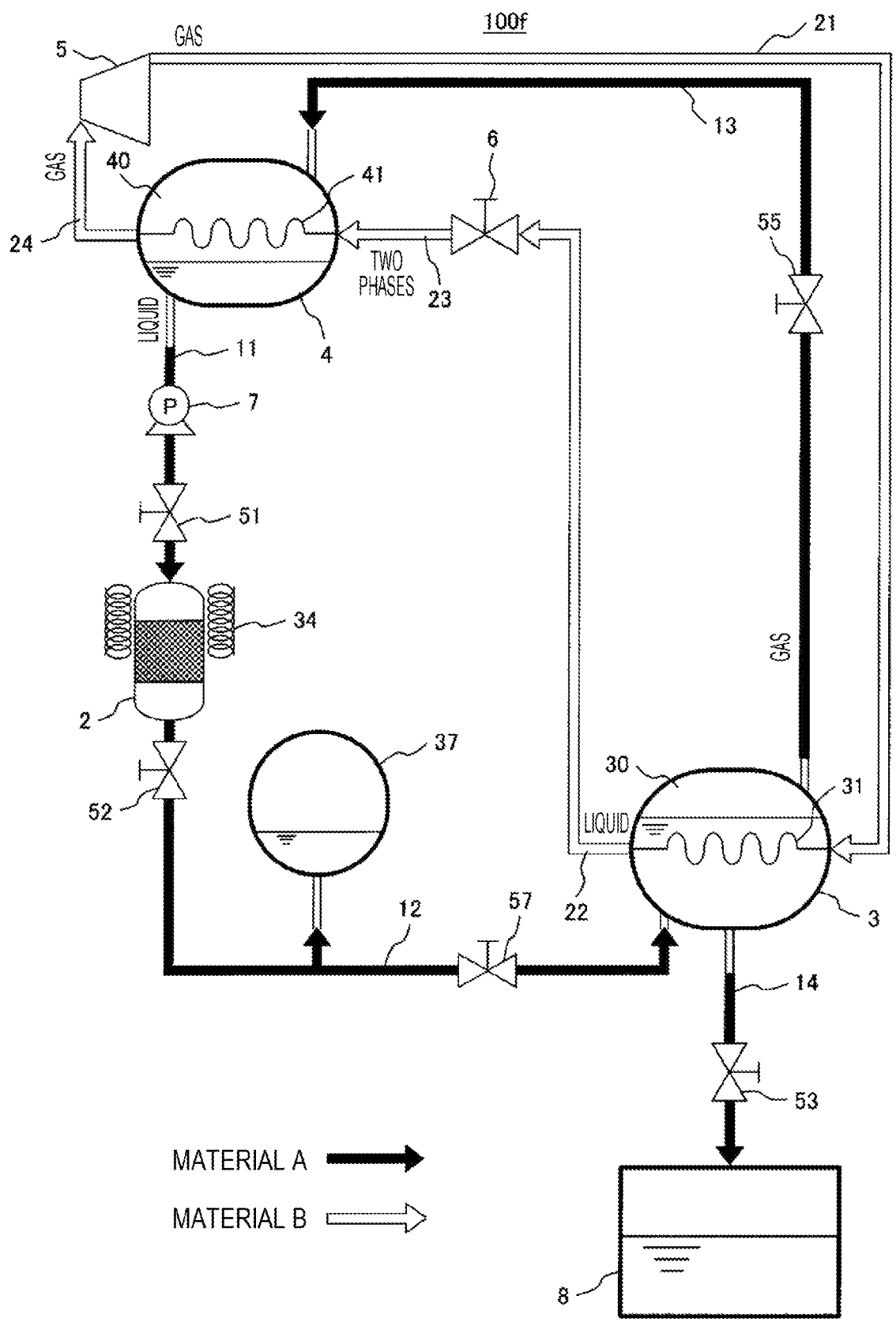
FIG. 6 is a schematic view illustrating a structure of a solid-liquid separating system according to Example 6.

FIG. 6 is a schematic view illustrating a structure of a solid-liquid separating system according to Example 6. A solid-liquid separating system 100f according to Example 6 is different from the solid-liquid separating system according to Example 2 in that the pipe 15 and the valve 56 are not provided and a heater 34 is provided at an upper part of the processing tank 2. With reference to FIG. 6, the solid-liquid separating system and the solid-liquid separating method according to Example 6 are described. Example 6 is different from Example 2 in the procedure of opening the processing tank 2.

An operation after the oil (DHA) is extracted from the processing object (fish) sealed in the processing tank 2 is described below. First, the valve 51 and the valve 57 are closed and the valve 52 is opened. Here, as the processing tank 2 is heated by the heater 34 provided at the upper part of the processing tank 2, the vapor pressure of the butane remaining in the processing tank 2 increases and the pressure on the upstream side of the processing tank 2 increases. Thus, the liquefied butane remaining in the processing tank 2 can be discharged and, by opening the processing tank 2 with the valve 52 closed, the amount of butane to be released to the air can be reduced.

According to the present example, similarly to Example 2, the processing object in the processing tank 2 can be exchanged without releasing the liquefied butane remaining in the processing tank 2 to the air.

Example 7

Figure 7A:
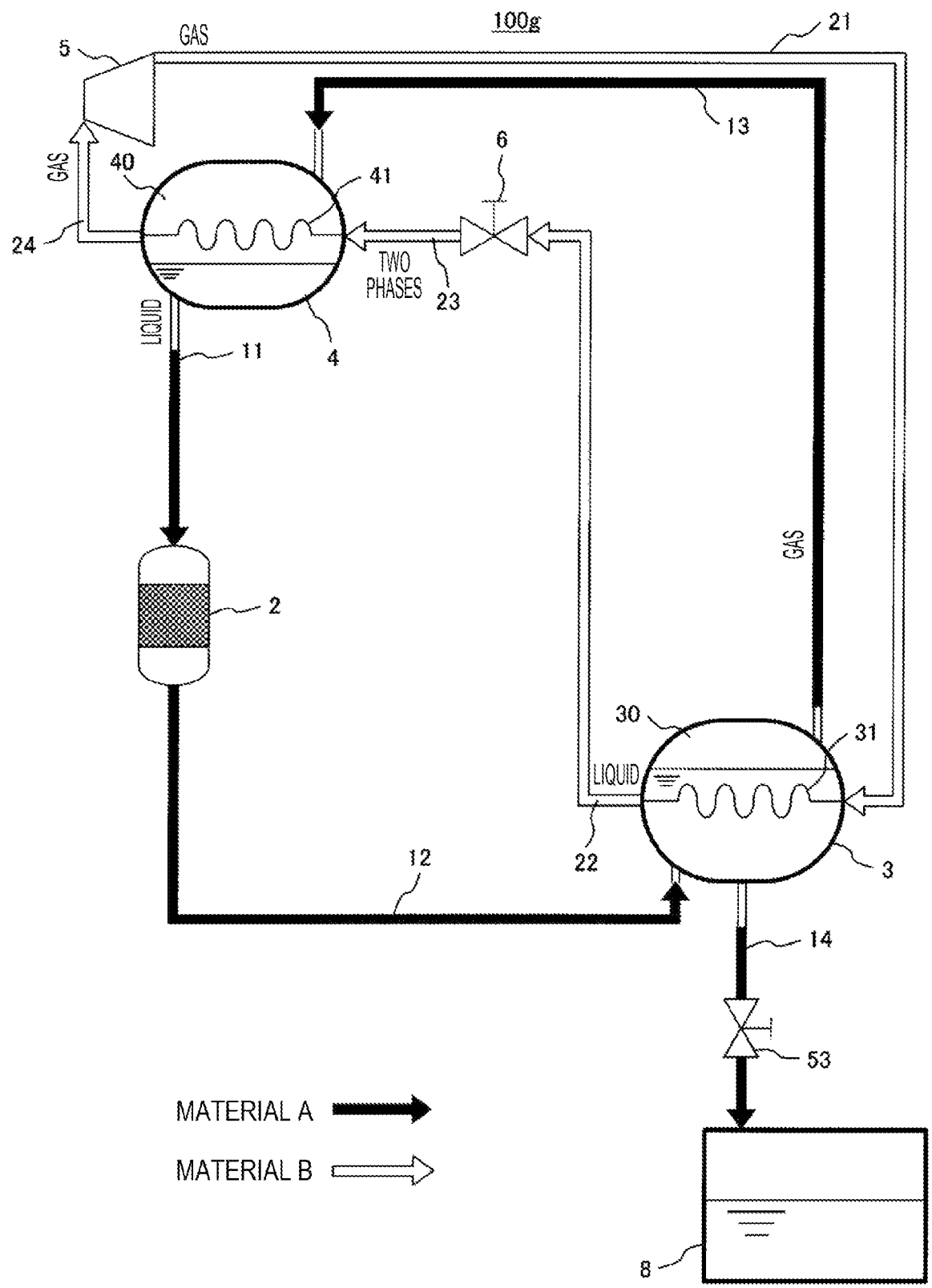
FIG. 7A is a schematic view illustrating a structure of a solid-liquid separating system according to Example 7.
Figure 7B:
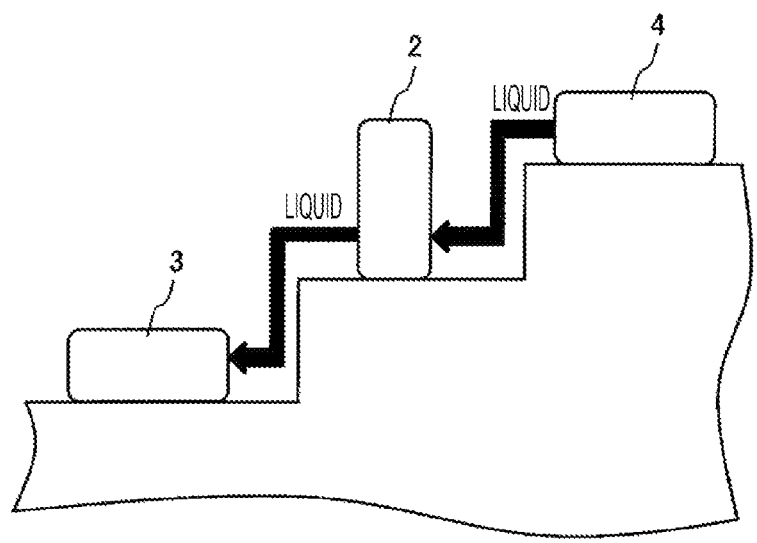
FIG. 7B is a schematic view illustrating side surfaces of heat exchangers and a processing tank in FIG. 7A.

FIG. 7A is a schematic view illustrating a structure of a solid-liquid separating system according to Example 7, and FIG. 7B is a schematic side view illustrating the heat exchangers and the processing tank in FIG. 7A. As illustrated in FIG. 7A and FIG. 7B, Example 7 is different from Example 1 in that the pipe 11 is not provided with the pump 7 and the heat exchanger 4, the processing tank 2, and the heat exchanger 3 are provided at the respective positions that decrease in height in this order.

In Example 1, the pump 7 is used to send the liquefied butane from the heat exchanger 4 to the heat exchanger 3 through the processing tank 2; in Example 1, the material A that is liquefied can be circulated by gravity without the use of the pump. Since the pump is unnecessary, the solid-liquid separating method and the solid-liquid separating system with the device structure and the process steps simplified further can be provided.

In this structure, the material A is not limited to the material that can dissolve oil and does not dissolve water as described in Example 1, and the material that can dissolve both water and oil, such as DME described in PTL 1, can be used. Therefore, as a specific example of the object to be extracted in the present example, not just the edible oil or aroma material (lipophilic) given in Example 1 but also any liquid that can dissolve in the material A can be used. For example, hydrophilic aroma material, a mixture of hydrophilic aroma material and lipophilic aroma material, and a water-soluble solid aroma material can also be employed as the object to be extracted. This structure is applicable not just to Example 1 but also to Examples 2 to 6. That is to say, if the pump 7 is removed and the heat exchanger 4, the processing tank 2, and the heat exchanger 3 are provided at the respective positions that decrease in height in this order, the pump is unnecessary. Thus, the solid-liquid separating method and the solid-liquid separating system with the device structure and the process steps simplified further can be provided.

As described above, according to the present invention, the solid-liquid separating method and the solid-liquid separating system for separating the processing object into solid and liquid in which fewer devices are used and the structure and steps are simplified further can be provided.

The present invention is not limited to the examples described above, and various modifications are included. For example, the examples described above in detail are intended to help the understanding of the present invention and are not limited to the examples including all the structures described herein. Apart of the structure of one example can be replaced by the structure of another example, or the structure of one example can be added to the structure of another example. A part of the structure of each example can be added to, deleted from, or replaced by another structure.

REFERENCE SIGNS LIST 2 processing tank
3, 4 heat exchanger
30, 40 shell
31, 41 tube
5, 32 compressor
33, 34, 36 heater
6 expansion valve
7 pump
8 collecting tank
11, 12, 13, 14, 15, 16, 17, 21, 22, 23, 24 pipe
35, 37 accumulator
51, 52, 53, 54, 55, 56, 57 valve
100a, 100b, 100c, 100d, 100e, 100f, 100g solid-liquid separating system

The invention claimed is:

1. A solid-liquid separating system in which, from a processing object containing water, oil, and solid, the oil is separated and collected from the processing object by use of a material A that is gaseous at normal temperature and normal pressure and when liquefied, can dissolve the oil and does not dissolve water, the solid-liquid separating system comprising:
a processing tank that houses the processing object;
a first heat exchanger that gasifies the material A contained in a mixture of the material A and the oil;
a second heat exchanger that liquefies the material A that has been gasified in the first heat exchanger;
a material A supplying means that supplies the material A that has been liquefied from the second heat exchanger to the first heat exchanger through the processing tank;
a collecting tank that is connected to the first heat exchanger via a second pipe and a valve;
a closed system configuration including the first heat exchanger, the second heat exchanger, a compressor, and an expansion valve; and
a material B that circulates in the closed system, such that the material B is in a liquefied state from the first heat exchanger to the expansion valve, is in a two-phase state from the expansion valve to the second heat exchanger and is in a gaseous state from the second heat exchanger to the first heat exchanger, wherein
the first heat exchanger condenses the material B which is compressed with the compressor and exchanges heat of condensation of the material B for heat of evaporation of the material A,
the expansion valve reduces pressure of the material B that has been condensed,
the second heat exchanger exchanges heat of evaporation of the material B for heat of condensation of the material A,
the material A that has been gasified while being separated from the oil in the first heat exchanger is liquefied in the second heat exchanger, and the material A that has been liquefied is supplied to the processing tank by the material A supplying means, and
by stopping the supply of the material A by the material A supplying means and continuing the circulation of the material B, the oil is collected from the first heat exchanger to the collecting tank.

2. The solid-liquid separating system according to claim 1, wherein water solubility in the material A that has been liquefied is 1 g/L or less at 20° C.

3. The solid-liquid separating system according to claim 1, wherein the material A has a boiling point of −100° C. or more and 10° C. or less.

4. The solid-liquid separating system according to claim 1, wherein the material A has a saturated vapor pressure of 2 MPa or less at normal temperature.

5. The solid-liquid separating system according to claim 1, wherein the material A contains at least one of propane, normal butane, isobutane, and neopentane as a main component.

6. The solid-liquid separating system according to claim 1, wherein
the second heat exchanger, the processing tank, and the first heat exchanger are provided at positions that decrease in height in this order.

7. The solid-liquid separating system according to claim 1, further comprising:

a pipe that connects between the first heat exchanger and the processing tank and supplies the material A that has been gasified in the first heat exchanger to the processing tank; and an accumulator connected to the pipe between the processing tank and the first heat exchanger, wherein the material A that has been liquefied in the processing tank is discharged and collected in the accumulator by the material A that has been gasified and supplied from the first heat exchanger to the processing tank through the pipe.

8. The solid-liquid separating system according to claim 7, further comprising a second compressor connected to the pipe that connects between the first heat exchanger and the processing tank.

9. The solid-liquid separating system according to claim 1, further comprising:
a heater connected to a pipe between the second heat exchanger and the processing tank; and
an accumulator connected to a pipe between the processing tank and the first heat exchanger, wherein
the material A that has been gasified by the heater in the pipe provided with the heater is supplied to the processing tank, and the material A that has been liquefied in the processing tank is discharged and collected in the accumulator.

10. The solid-liquid separating system according to claim 1, further comprising:
a first accumulator connected to a pipe between the second heat exchanger and the processing tank;
a heater connected to the first accumulator; and
a second accumulator connected to a pipe between the processing tank and the first heat exchanger, wherein
the material A that has been liquefied is supplied from the second heat exchanger to the first accumulator, the material A that has been liquefied and housed in the first accumulator is gasified by the heater, the material A that has been gasified is supplied to the processing tank, and the material A that has been liquefied in the processing tank is discharged and collected in the second accumulator.

11. The solid-liquid separating system according to claim 1, further comprising:
a heater connected to the processing tank; and
an accumulator connected to a pipe between the processing tank and the first heat exchanger, wherein
the material A that has been liquefied in the processing tank is gasified by the heater, the material A that has been gasified is supplied to the processing tank, and the material A that has been liquefied in the processing tank is discharged and collected in the accumulator.

12. A solid-liquid separating method in which, from a processing object containing water, oil, and solid, the oil is separated and collected from the processing object by use of a material A that is gaseous at normal temperature and normal pressure and when liquefied, can dissolve the oil and does not dissolve water, the method comprising:
a step of supplying the material A to the processing object in a liquid state so as to obtain a mixture in which the oil is dissolved in the material A;
a step of gasifying, via a first heat exchanger, the material A contained in the mixture by heating the mixture so as to separate the oil from the material A and collect the oil;
a step of cooling, via a second heat exchanger connected via a pipe to the first heat exchanger, the material A that has been gasified so as to liquefy the material A, and supplying the material A that has been liquefied to the processing object again; and
a step of stopping the supply of the material A and collecting, via a collecting tank that is connected to the first heat exchanger via a second pipe and a valve, the oil, wherein
the material A is gasified and liquefied while exchanging heat with a material B, the material B repeats a process of compression, condensation, expansion, and evaporation in a closed system.

13. A solid-liquid separating system in which, from a processing object containing liquid and solid, the liquid is separated and collected from the processing object by use of a material A that is gaseous at normal temperature and normal pressure and when liquefied, can dissolve the liquid, the solid-liquid separating system comprising:
a processing tank that houses the processing object;
a first heat exchanger that gasifies the material A contained in a mixture of the material A and the liquid;
a second heat exchanger that liquefies the material A that has been gasified in the first heat exchanger;
a material A supplying means that supplies the material A that has been liquefied from the second heat exchanger to the first heat exchanger through the processing tank;
a collecting tank that is connected to the first heat exchanger via a second pipe and a valve;
a closed system including the first heat exchanger, the second heat exchanger, a compressor, and an expansion valve; and
a material B that circulates in the closed system, such that the material B is in a liquefied state from the first heat exchanger to the expansion valve, is in a two-phase state from the expansion valve to the second heat exchanger and is in a gaseous state from the second heat exchanger to the first heat exchanger, wherein
the first heat exchanger condenses the material B which is compressed with the compressor and exchanges heat of condensation of the material B for heat of evaporation of the material A,
the expansion valve reduces pressure of the material B that has been condensed,
the second heat exchanger exchanges heat of evaporation of the material B for heat of condensation of the material A,
the material A that has been gasified while being separated from the liquid in the first heat exchanger is liquefied in the second heat exchanger, and the material A that has been liquefied is supplied to the processing tank by the material A supplying means,
by stopping the supply of the material A by the material A supplying means and continuing the circulation of the material B, the liquid is collected from the first heat exchanger to the collecting tank, and
the second heat exchanger, the processing tank, and the first heat exchanger are provided at positions that decrease in height in this order.

14. The solid-liquid separating system according to claim 13, further comprising:
a pipe that connects between the first heat exchanger and the processing tank and supplies the material A that has been gasified in the first heat exchanger to the processing tank; and
an accumulator connected to the pipe between the processing tank and the first heat exchanger, wherein
the material A that has been liquefied in the processing tank is discharged and collected in the accumulator by the material A that has been gasified and supplied from the first heat exchanger to the processing tank through the pipe.

15. The solid-liquid separating system according to claim 14, further comprising a second compressor connected to the pipe that connects between the first heat exchanger and the processing tank.

16. The solid-liquid separating system according to claim 13, further comprising:
   a heater connected to a pipe between the second heat exchanger and the processing tank; and
   an accumulator connected to a pipe between the processing tank and the first heat exchanger, wherein
   the material A that has been gasified by the heater in the pipe provided with the heater is supplied to the processing tank, and the material A that has been liquefied is discharged from the processing tank and collected in the accumulator.

17. The solid-liquid separating system according to claim 13, further comprising:
   a first accumulator connected to a pipe between the second heat exchanger and the processing tank;
   a heater connected to the first accumulator; and
   a second accumulator connected to a pipe between the processing tank and the first heat exchanger, wherein
   the material A that has been liquefied is supplied from the second heat exchanger to the first accumulator, the material A that has been liquefied and housed in the first accumulator is gasified by the heater, the material A that has been gasified is supplied to the processing tank, and the material A that has been liquefied is discharged from the processing tank and collected in the second accumulator.

18. The solid-liquid separating system according to claim 13, further comprising:
   a heater connected to the processing tank; and
   an accumulator connected to a pipe between the processing tank and the first heat exchanger, wherein
   the material A that has been liquefied in the processing tank is gasified by the heater, the material A that has been gasified is supplied to the processing tank, and the material A that has been liquefied is discharged from the processing tank and collected in the accumulator.

19. A solid-liquid separating method in which, from a processing object containing liquid and solid, the liquid is separated and collected from the processing object by use of a material A that is gaseous at normal temperature and normal pressure and when liquefied, can dissolve the liquid, the solid-liquid separating method comprising:
   a step of supplying the material A to the processing object in a liquid state in a processing tank so as to obtain a mixture in which the liquid is dissolved in the material A;
   a step of gasifying the material A contained in the mixture by heating the mixture by a first heat exchanger so as to separate the liquid from the material A and collect the liquid; and
   a step of cooling and liquefying the material A that has been gasified by a second heat exchanger connected via a pipe to the first heat exchanger, and supplying the material A to the processing object again by a material A supplying means; and
   a step of stopping the supply of the material A and collecting the oil by a collecting tank that is connected to the first heat exchanger via a second pipe and a valve, wherein
   the material A is gasified and liquefied while exchanging heat with a material B, the material B repeats a process of compression, condensation, expansion, and evaporation in a closed system, and
   the second heat exchanger, the processing tank, and the first heat exchanger are provided at positions that decrease in height in this order.

\* \* \* \* \*